United States Patent
Fantappie et al.

(10) Patent No.: US 12,338,117 B2
(45) Date of Patent: Jun. 24, 2025

(54) BEVERAGE DISPENSER WATER SUPPLY CONNECTOR

(71) Applicant: PepsiCo, Inc., Purchase, NY (US)

(72) Inventors: Giancarlo Fantappie, Rancho Palos Verdes, CA (US); Steven Jersey, Laguna Niguel, CA (US); Thomas Parker, London (GB); Jafarr Adam, Cambridge (GB); Andrew Taylor, Cambridge (GB)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 18/314,545

(22) Filed: May 9, 2023

(65) Prior Publication Data

US 2023/0356993 A1    Nov. 9, 2023

Related U.S. Application Data (60) Provisional application No. 63/364,369, filed on May 9, 2022.

(51) Int. Cl.
*B67D 1/12* (2006.01)
*B67D 1/00* (2006.01)
*F16K 15/18* (2006.01)

(52) U.S. Cl.
CPC ......... *B67D 1/1281* (2013.01); *B67D 1/0014* (2013.01); *F16K 15/184* (2021.08); *B67D 2210/0001* (2013.01); *B67D 2210/00062* (2013.01); *F16K 2200/204* (2021.08)

(58) Field of Classification Search
CPC ...... B67D 1/1281; B67D 1/0014; B67D 1/12; B67D 1/14; B67D 1/0042; B67D 2210/0001; B67D 2210/00062; B67D 2210/00052; F16K 15/184; F16K 2200/204; F16K 2200/201; F16K 27/0209
See application file for complete search history.

(56) References Cited

U.S. PATENT DOCUMENTS

| | | | |
|---|---|---|---|
| 857,897 | A | 6/1907 | Patterson |
| 2,103,427 | A | 12/1937 | Long |
| 5,152,429 | A | 10/1992 | Billings |
| 6,105,609 | A | 8/2000 | Polidan et al. |
| 6,757,589 | B1 * | 6/2004 | Parker ............... F16K 37/0075 700/282 |
| 9,046,182 | B2 | 6/2015 | Fukano et al. |
| 2013/0112302 | A1 * | 5/2013 | Fukano ............... F16K 15/144 137/843 |

(Continued)

OTHER PUBLICATIONS

International Search Report and Written Opinion in counterpart International Application No. PCT/US2023/066733 mailed Sep. 1, 2023, 10 pages.

*Primary Examiner* — Kelsey E Cary
(74) *Attorney, Agent, or Firm* — Sterne, Kessler, Goldstein & Fox P.L.L.C.

(57) ABSTRACT

Aspects of the present disclosure include a connector that interfaces a beverage dispenser with an external water supply. The connector includes a backflow preventer that only allows water to flow from the external water supply to the beverage dispenser. Some aspects of the connector also include a pressure regulator configured to reduce incoming water pressure to a desired pressure. The connector is configured to be mounted to a suitable surface, such as the rear of the beverage dispenser.

13 Claims, 10 Drawing Sheets

(56) References Cited

U.S. PATENT DOCUMENTS

| | | | |
|---|---|---|---|
| 2013/0299726 A1* | 11/2013 | Karasawa | F16L 29/007 |
| | | | 251/148 |
| 2016/0123483 A1* | 5/2016 | Fudge | F16K 15/063 |
| | | | 137/512 |
| 2016/0178076 A1* | 6/2016 | Cellemme | F16K 15/063 |
| | | | 137/512 |
| 2017/0343146 A1* | 11/2017 | Jepp | F24D 3/1083 |
| 2022/0055885 A1* | 2/2022 | Robinson | B67D 1/0085 |
| 2022/0082174 A1 | 3/2022 | Ruzicka et al. | |

\* cited by examiner

BEVERAGE DISPENSER WATER SUPPLY CONNECTOR

FIELD

This disclosure relates to beverage dispensers. Specifically, this disclosure relates to systems and methods for connecting a beverage dispenser to an external water supply.

BACKGROUND

Beverage dispensers are used to provide beverages to users on demand. They generally require connection to an external source of potable water. The beverage dispenser mixes this water with various concentrates, additives, and carbonating gases to create the desired beverage. Connecting an appliance like a beverage dispenser to an external water source is facilitated with two primary elements. First, a backflow prevention device is typically required by regulation. Backflow prevention devices function to prevent fluid from inside the beverage dispenser from flowing back into the external water supply. This prevents the external water supply from being contaminated. Second, a pressure regulator is often included in the connection between an appliance and an external water supply to ensure that the water being supplied to the beverage dispenser is maintained at a desired pressure. While external water supplies can, and often are, regulated to a desired pressure, a separate pressure regulator can be used to ensure that the components in the dispenser are not subject to excess water pressure in situations where the external water pressure regulation fails or is not consistent. Thus, there exists a need for backflow prevention devices and water pressure regulators in the plumbing connection between the beverage dispenser and the external water supply.

In some aspects, beverage dispensers disclosed here are intended for light commercial (i.e., office) or home use. In these situations, it is desirable for the beverage dispenser to be capable of installation by an end user, instead of requiring a skilled plumber. This improves the end user's experience by minimizing installation cost and time. Thus, it is also desirable for the backflow prevention device and water pressure regulator to be incorporated into a single device that can be easily connected to the beverage dispenser and existing water supply.

BRIEF SUMMARY

An aspect of a water supply connector for a beverage dispenser according to the present disclosure includes a cylindrical housing, a first end housing disposed at one end of the cylindrical housing, a second end housing disposed at a second end of the cylindrical housing, first and second fluid connections configured to fluidly connect an interior of the cylindrical housing with external plumbing, each of which is disposed at a distal end of one of the first end housing and the second end housing, respectively; and a backflow preventer comprising a check valve disposed in the first end housing and the cylindrical housing, the backflow preventer configured to only permit water flow from the first end housing to the second end housing.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Reference will now be made in detail to representative aspects illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspect whether or not explicitly described.

Simplifying the external plumbing connections of a beverage dispenser is accomplished by a single, integrated valve connector. This connector includes a backflow prevention device that ensures that fluid cannot flow from the beverage dispenser to the external plumbing. Some aspects of this connector also include a pressure regulator to ensure water supply pressure is within the required range. The connector has externally accessible connectors that allow for quick interfacing between the external plumbing connection and the beverage dispenser. The connector also includes mounting features that allow it to be mounted to an external surface of the beverage dispenser, and is sized to ensure that the connector does not extend too far from the beverage dispenser. Thus, the disclosed connector provides benefits including a simple, easily installed plumbing connector that reduces installation time of the beverage dispenser.

Referring to FIGS. 1-4, an aspect of a beverage dispenser 1 includes a housing 100. As illustrated in the Figures, housing 100 (also called cladding 100) may be formed as a rectangular prism, with a front wall 101, rear wall 102, right wall 103, left wall 104, top wall 105, and bottom wall 106 (collectively, "the housing walls"). Housing 100 may also be formed in non-rectangular shapes, such as cylindrical, spherical, or other prismatic shapes with more than six sides. The housing walls may be formed from one continuous element, or may be formed from multiple elements (e.g., sheets of metal, or plastic partitions) joined together. Furthermore, the housing walls may include openings to access the interior of housing 100, and may also include attachment points for elements mounted on the exterior or interior surfaces of the walls. The housing walls may be formed from any suitable material, including, for example, aluminum, steel, and plastic materials. The housing walls may be joined together using any suitable method, such as adhesives, welding, or mechanical fastening or connectors.

Figure 2:
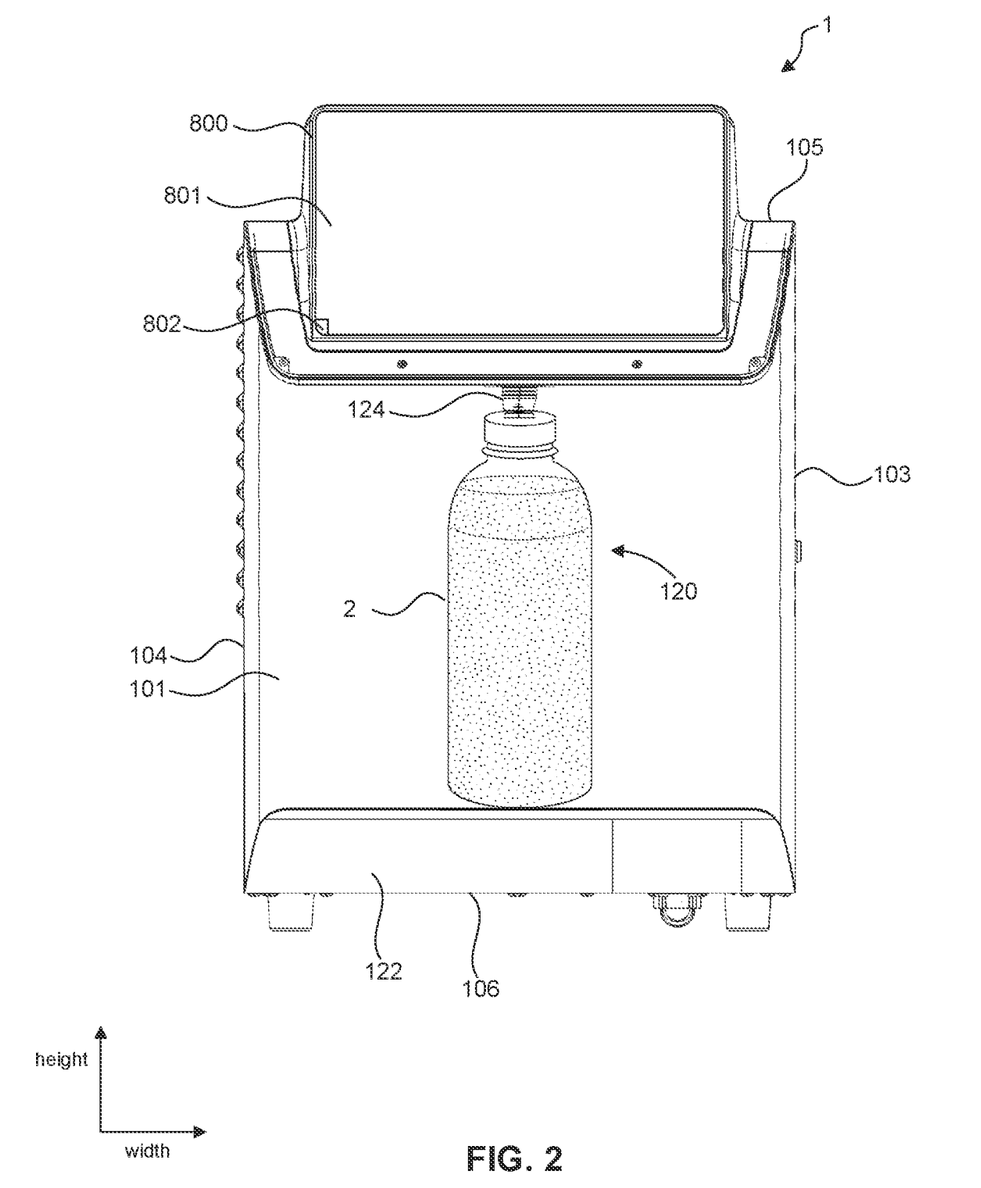
FIG. 2 is a front view of a beverage dispenser according to an aspect.
Figure 3:
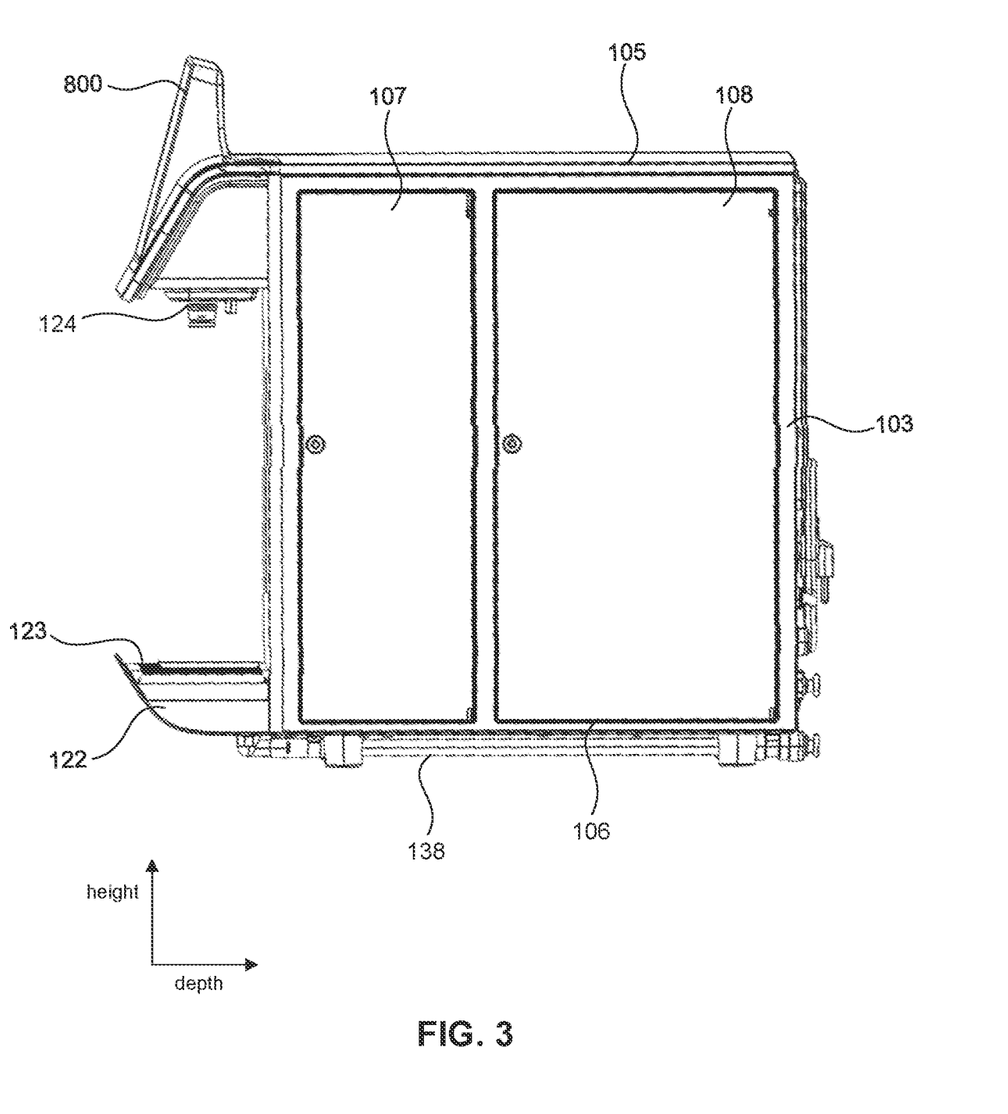
FIG. 3 is a side view of a beverage dispenser according to an aspect.

For purposes of this disclosure and solely for ease of reference, directions as illustrated in FIGS. 2-3 are defined as follows. The height direction is the direction extending perpendicular to top wall 105 and bottom wall 106, the width direction is the direction extending perpendicular to right wall 103 and left wall 104, and the depth direction is the direction extending perpendicular to front wall 101 and rear wall 102.

In some aspects, housing 100 may be sized to be suitable for placement in a non-typical dispenser location, such as, for example, on a countertop in an office pantry, break-room or home kitchen. Counters have a standard depth of 60 centimeters (23.6 inches). Most kitchens counters have wall-cabinets built above the counters at a height that, in some cases, is as low as 16 inches. In addition, space on the counter is limited and a dispenser larger than 18 inches would be too wide for most home kitchens. For those reasons, in some aspects, housing 100 may not exceed 16 inches in the height direction, 18 inches in the width direction, and 23 inches in the depth direction. Furthermore, in these aspects beverage dispenser 1 may weigh less than 45 pounds without any onboard removable consumables present. These aspects have the advantage or being easily positioned in non-typical locations, such as the aforementioned countertops. As will be discussed in detail below, these compact aspects of beverage dispenser 1, include all components required to dispense a beverage inside housing 100. Specifically, none of the consumables (e.g., beverage concentrate, $CO_2$ gas canisters, alkaline chambers and water filters) or dispensing elements (e.g., pumps, valves) are located outside of housing 100. These aspects of beverage dispenser 1 still require an external connection to power and water source to function.

Figure 1:
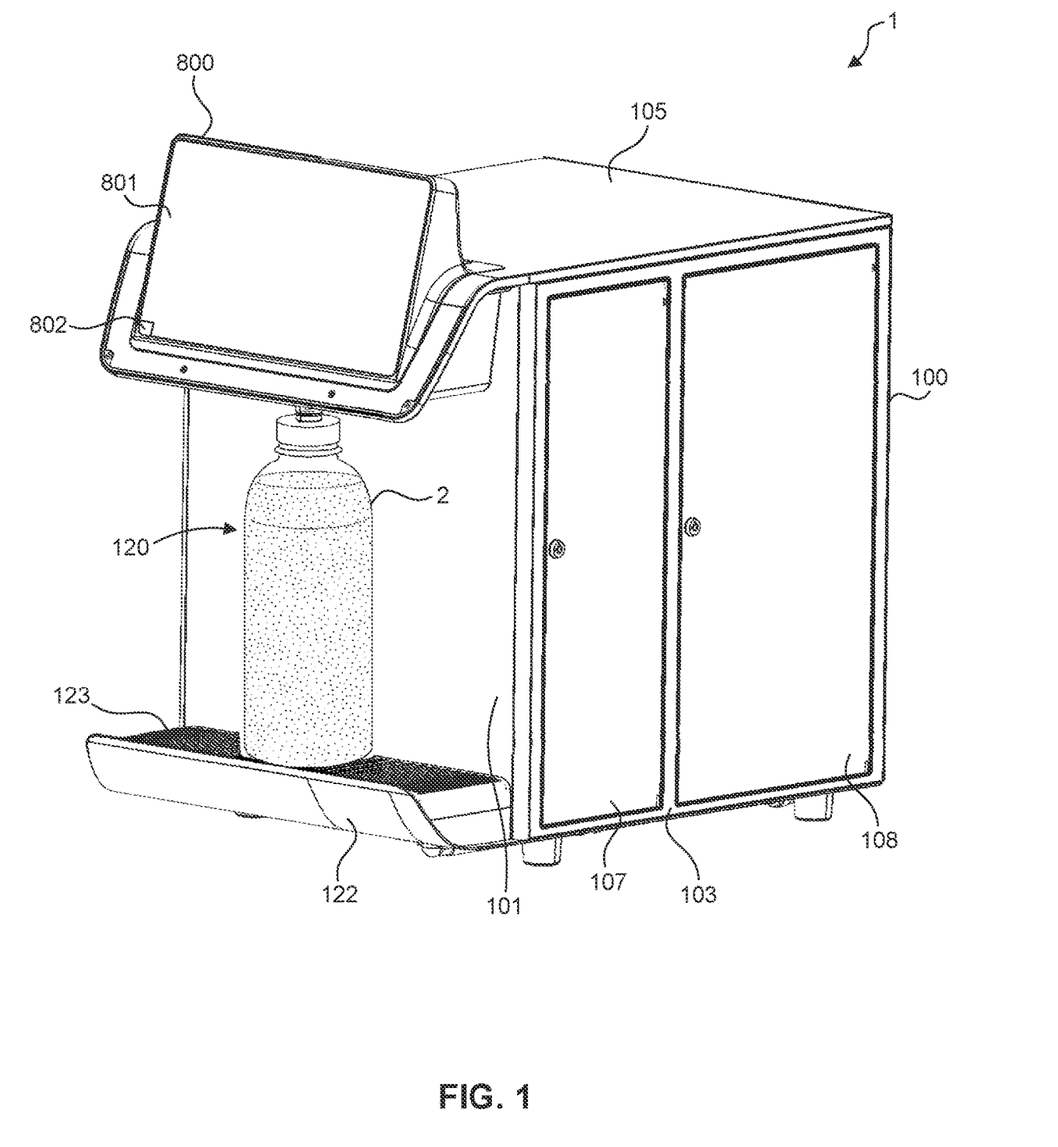
FIG. 1 is a perspective view of a beverage dispenser according to an aspect.

As best shown in FIGS. 1 and 2, beverage dispenser 1 includes a dispensing zone 120 that is configured to receive a container 2. A nozzle 124 is disposed on front wall 101 in the dispensing zone 120. A drip tray 122 is also disposed on front wall 101 in dispensing zone 120. Drip tray 122 includes a surface 123 configured to support container 2 under nozzle 124 while it is being filled. Surface 123 includes openings to form a grid that allow any drips or spills to drain through surface 123 into the body of drip tray 122. A display 800 is also disposed on front wall 101 above nozzle 124. Display 800 can be used to control aspects of the operation of beverage dispenser 1 and to display information regarding the operation of beverage dispenser 1.

Figure 3A:
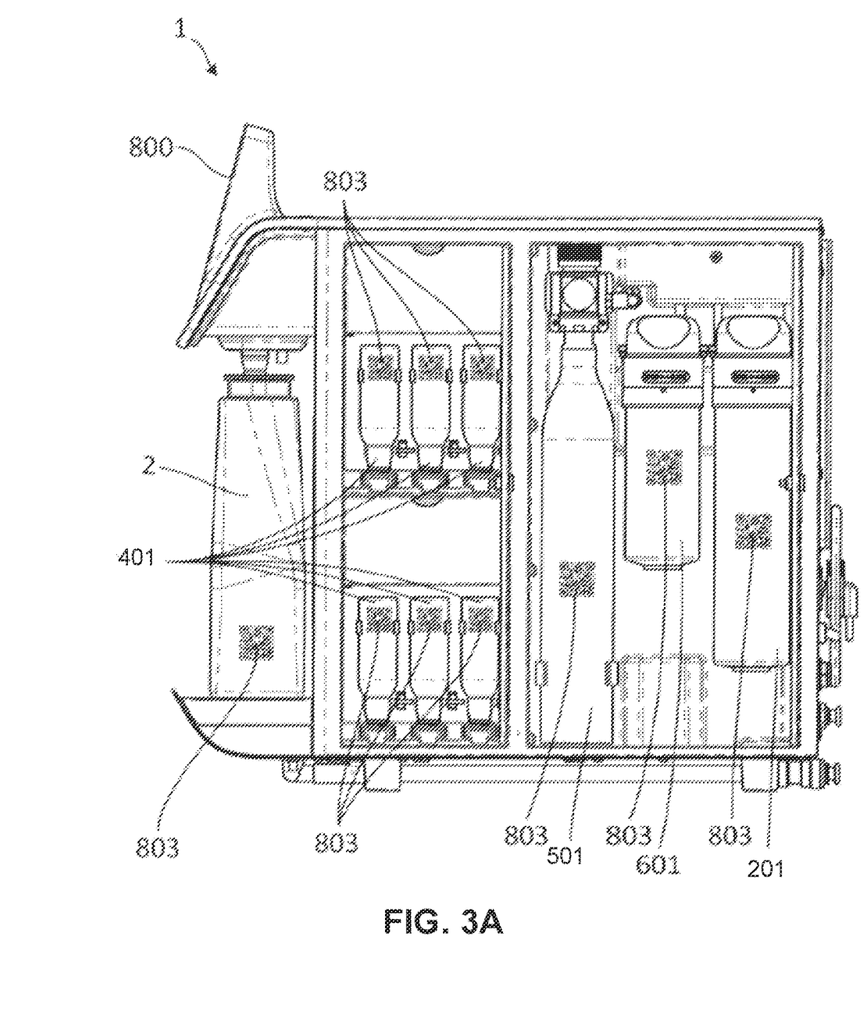
FIG. 3A is the side view of FIG. 3 showing replaceable consumables, according to an aspect.

As shown in FIGS. 3 and 3A, in some aspects, housing 100 includes one or more removable panels or doors that allow access to an interior of housing 100 from the exterior. For example, in some aspects housing 100 includes access doors 107 and 108 (on right wall 103). Access doors 107 and 108 (collectively, "the access doors") cover openings in their corresponding walls that enable a user to access the interior of housing 100 to access the replaceable consumables of beverage dispenser 1. The access doors may be made from any suitable material and are removably fastened to their corresponding wall using hinges, mechanical fasteners, or any other suitable method for removably attaching the access doors. Doors may be locked in the closed position with keys or stay in the closed position with a magnet or other latching mechanisms. FIG. 3A is the side view of FIG. 3 with access doors 107 and 108 removed to show an example arrangement of the removable consumables accessible through the access doors. As shown in FIG. 3A, inside access door 107 six concentrate containers 401 are shown, and inside access door 108 one $CO_2$ gas cylinder 301, one alkaline chamber 601 and one water filter 501 are shown. Each of these consumables are easily accessible and quick replaceable by any unskilled user when empty or exhausted, as will be described in detail below. The number and type of consumables present in housing 100 can vary depending on the features and capabilities present in a specific aspect of beverage dispenser 1.

Figure 4:
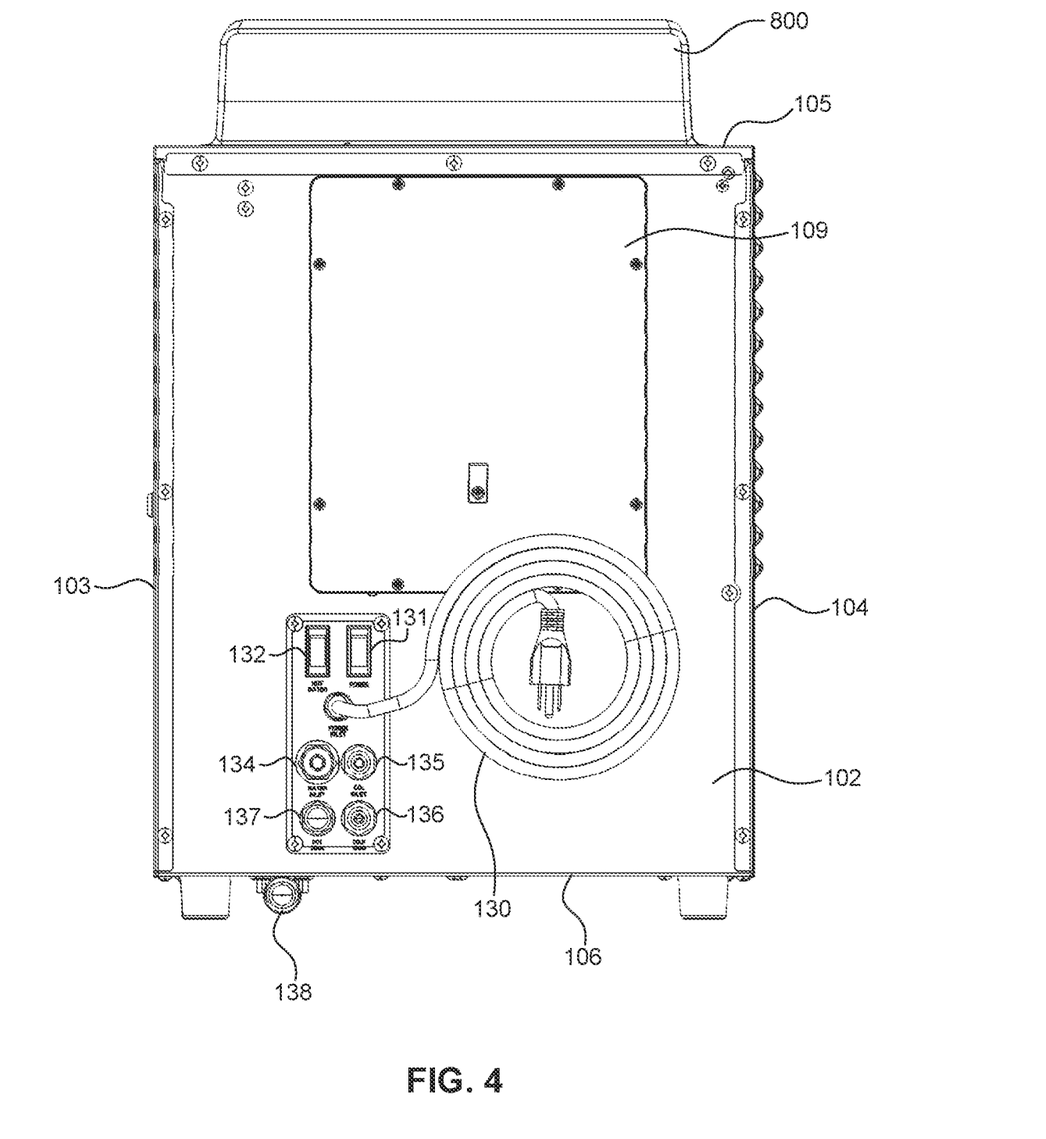
FIG. 4 is a rear view of a beverage dispenser according to an aspect.

As shown in FIG. 4, in some aspects rear wall 102 may include various external connections. Visible in the aspect shown in FIG. 4 is a power cord 130 that is configured to plug in to a suitable outlet to provide power to beverage dispenser 1. A power switch 131 and a hot water switch 132 control the flow of power to elements of beverage dispenser 1. A water inlet 134 is provided on rear wall 102 to receive ambient water from a water source. A $CO_2$ inlet 135 is also provided on rear wall 102 to receive an external source of $CO_2$ for carbonation purposes, if internal $CO_2$ gas cylinder 301 is deemed insufficient for a large community of people in a large office space. A cold water drain 136 and hot water drain 137 are also located on rear wall 102 to drain the water bath of the internal chiller and the hot water from the hot water tank, respectively, anytime the dispenser must be moved, relocated, or re-packaged and transported. Finally, a drip tray drain 138 is also shown in FIGS. 3 and 4. Some of these connections may be optional in some aspects of beverage dispenser 1. In addition, an access door 109 (on rear wall 102) serves to provide maintenance access for servicing interior components of housing 100, such as the main PCB board and the IoT communication board for cell, wireless and, bluetooth connectivity.

Figure 5:
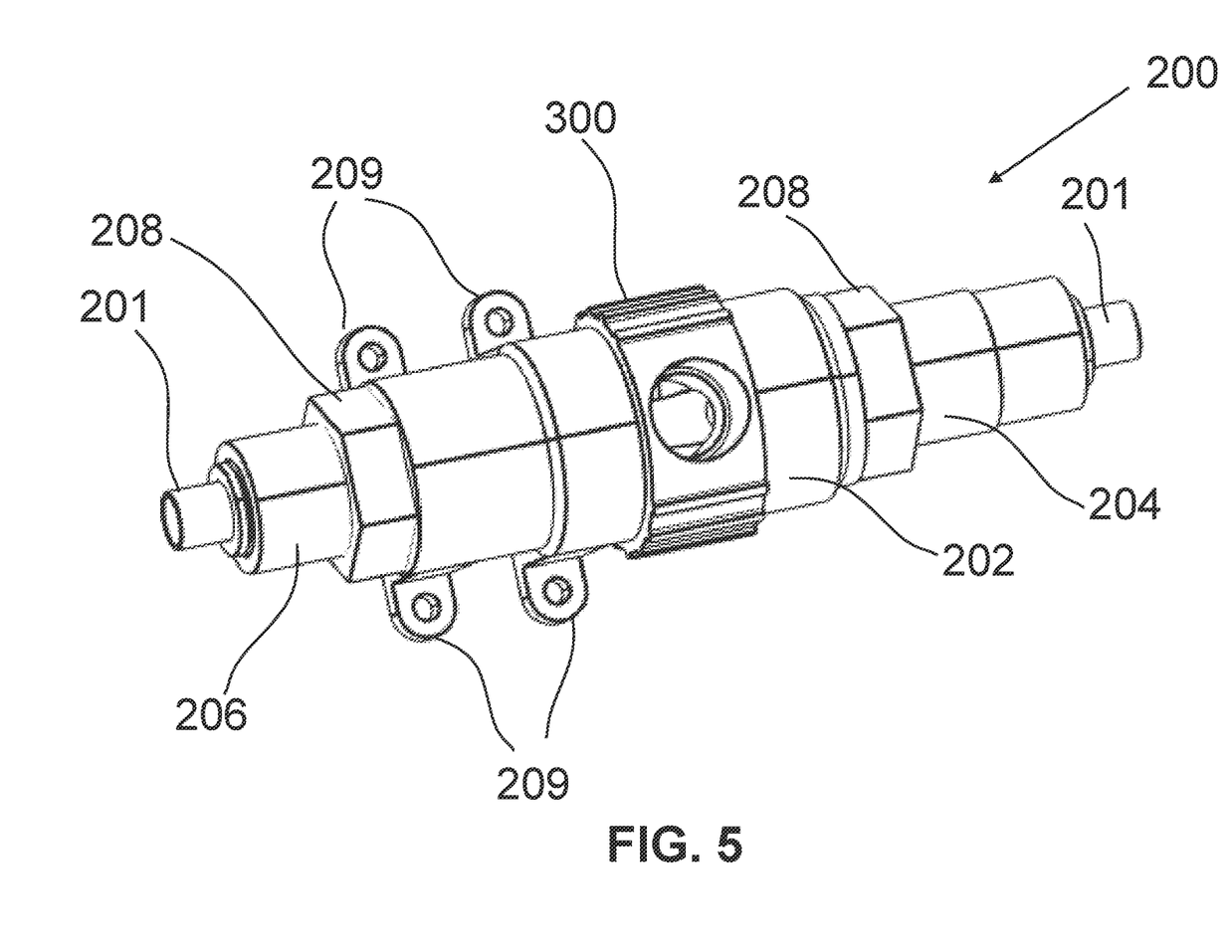
FIG. 5 is a perspective view of a beverage dispenser connector according to an aspect.
Figure 6:
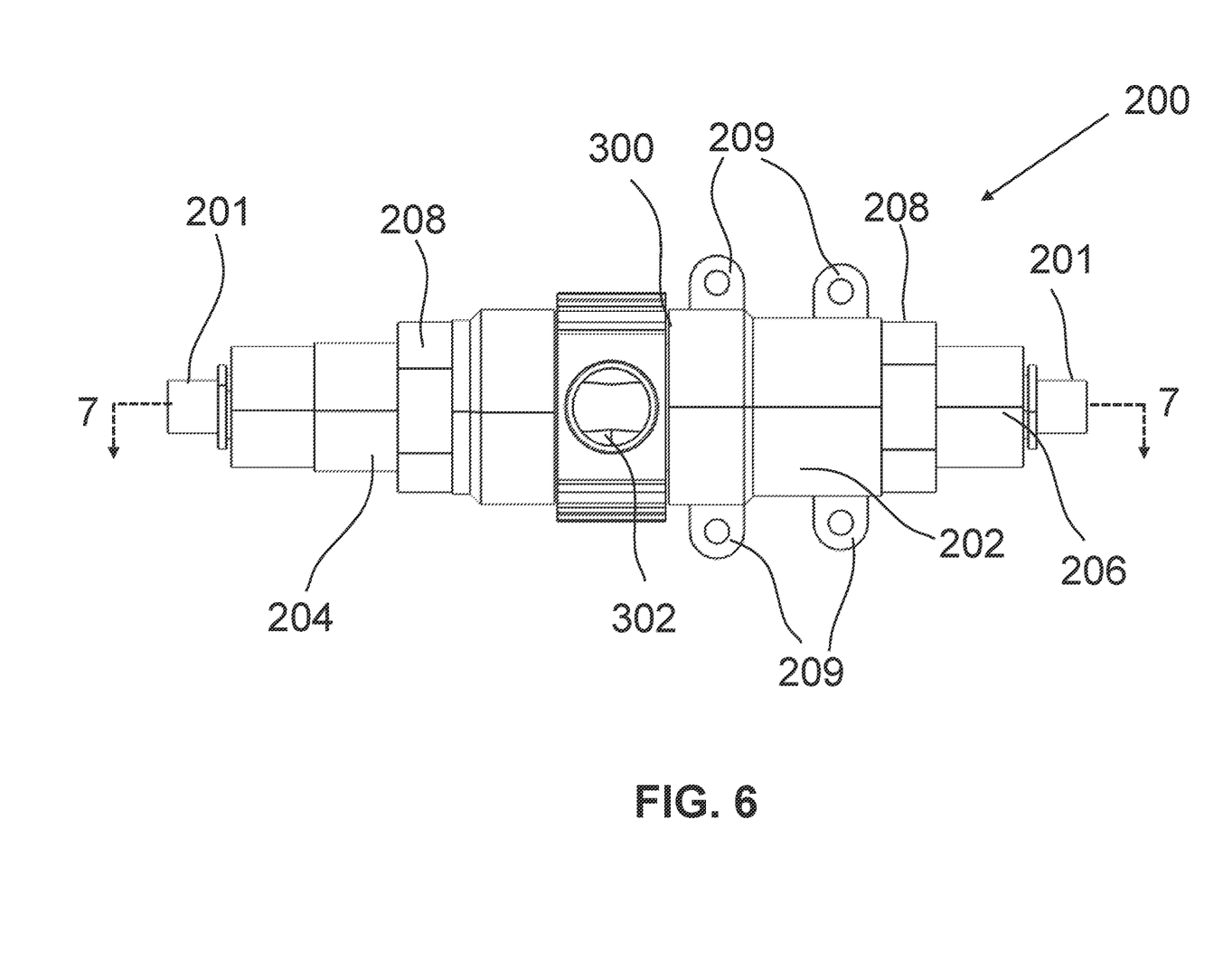
FIG. 6 is a top view of a beverage dispenser connector according to an aspect.

A connector 200 for beverage dispenser 1 is shown in FIGS. 5-7 and 9. As seen in FIGS. 5 and 6, connector 200 is formed from a centrally-disposed housing 202 that is formed with stepped cylindrical shape. A first end housing 204 and a second end housing 206 are attached to each end of housing 202, and are also formed with approximately cylindrical shapes. First end housing 204 and second end housing 206 are separable from housing 202. They are attached to housing 202 via a pair of nuts 208, one for each of first end housing 204 and second end housing 206. After first end housing 204 and second end housing 206 are positioned in contact with housing 202, nuts 208 slide over the distal ends of first end housing 204 and second end housing 206 and are threaded onto corresponding threads on the exterior of housing 202. Nuts 208 allow connector 200 to be separated into its component parts with basic hand tools by removing nuts 208 and separating first end housing 204 and second end housing 206 to access the internal elements of connector 200 for cleaning and maintenance. This improves the end user experience because it improves ease of maintenance of connector 200.

Fluid connections 201 are disposed at the distal end of each of first end housing 204 and second end housing 206. Fluid connections 201 are configured to fluidly connect to an incoming water source (for fluid connection 201 disposed on first end housing 204) and to fluidly connect to beverage dispenser 1 (for fluid connection 201 disposed on second end housing 206). Fluid connections 201 can include suitable plumbing connection elements to facilitate fluid connections, such as threaded elements or quick-connect fittings.

Mounts 209 are disposed on housing 202 and are configured to allow connector 200 to be attached to a suitable support surface. For example, as shown in FIG. 5, there can be four mounts 209, each formed as a protrusions extending from housing 202. Each mount 209 can have an opening to receive a fastener (e.g., a screw) that passes through the opening and can be used to secure mount 209 (and, thus, connector 200) to a suitable support surface. For example, connector 200 may be secured to the rear of beverage dispenser 1 in this manner. In some aspects, the total height of connector 200, as measured from the bottom of mount 209 to the uppermost portion of connector 200 may be no more than 50 millimeters. This ensures that connector 200 does not extend too far when it is mounted to beverage dispenser 1.

Aspects of connector 200 include a backflow preventer 210, which is configured to prevent fluid from passing through connector 200 into the external water supply. Backflow preventers are often required by regulation for appliances that are permanently connected to public water supplies.

Figure 7:
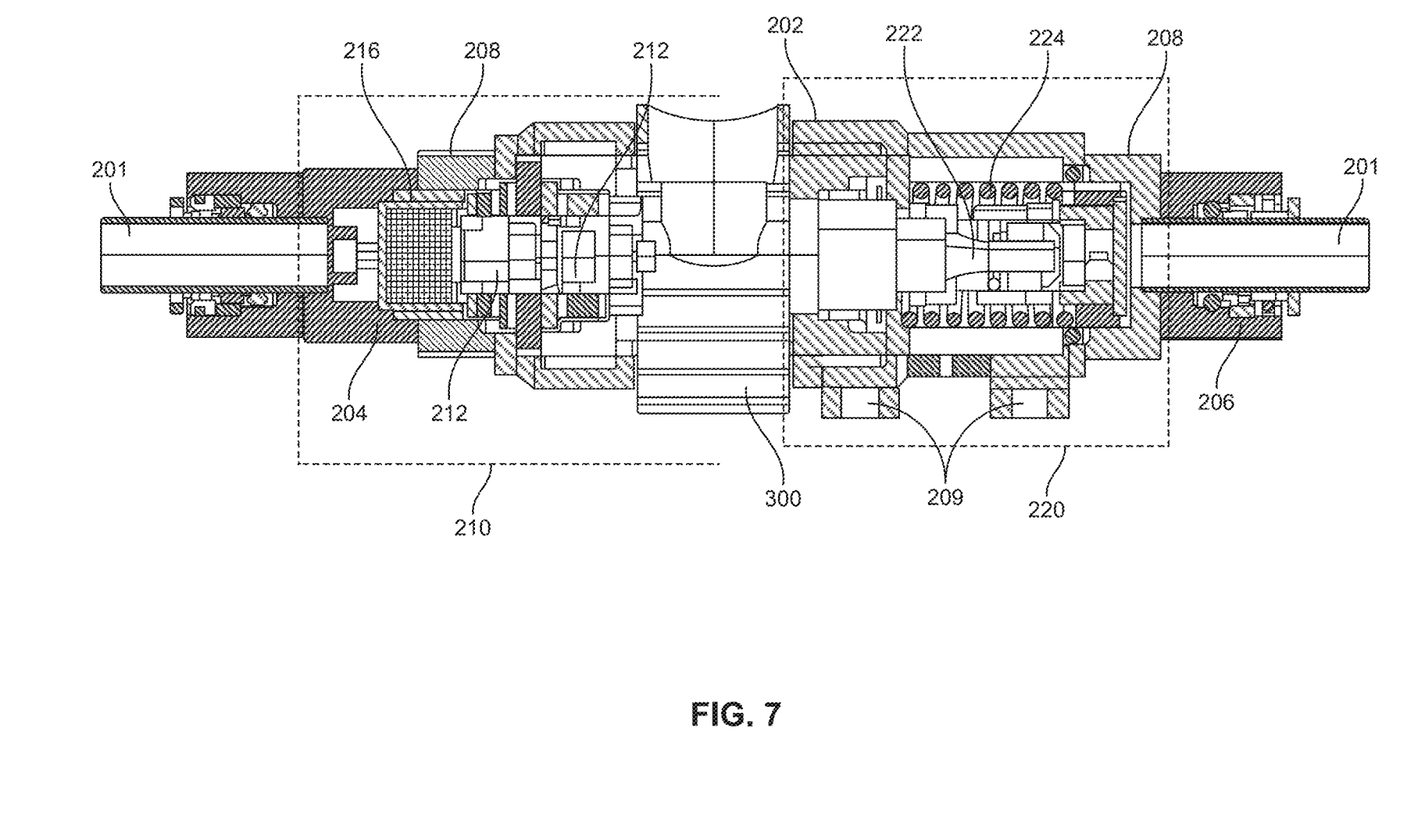
FIG. 7 is a cross section of a beverage dispenser connector according to an aspect.

As shown in FIG. 7, backflow preventer 210 comprises two main elements: a strainer 216 and at least one check valve 212. Strainer 216 is positioned upstream of check valve 212 (i.e., closer to a distal end of first end housing 204) and functions to strain contaminants from the incoming water. Strainer 216 can be constructed from any suitable material, such as a metal or plastic mesh, and can be sized to filter out contaminants larger than a desired size (e.g., 10, 20, 30, 40, or 50 microns). In doing so, strainer 216 reduces the likelihood that that contaminants can jamb check valve 212 or will ultimately enter beverage dispenser 1. Strainer 216 is positioned to be easily accessible once first end housing 204 is removed, improving access for cleaning and maintenance of strainer 216.

Figure 8:
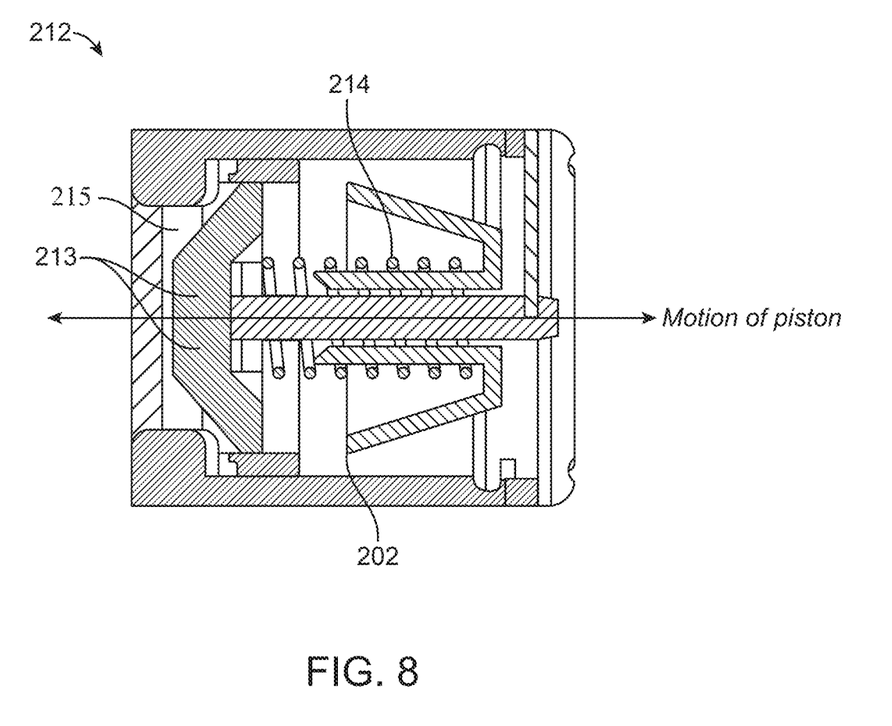
FIG. 8 is a detail view of a check valve assembly according to an aspect.

Check valve 212 functions to only allow fluid to flow in a single desired direction (i.e., from first end housing 204 towards housing 202). In the aspect shown in FIG. 7, there are two check valves 212 placed in series with respect to the water flow. However, other aspects of backflow preventer 210 can have a single check valve 212, or more than two check valves 212. A detail view of an example check valve 212 is shown in FIG. 8. A piston 213 is biased closed against a piston seat 215 by a spring 214. Water normally enters from the left in FIG. 8 and pushes piston 213 open against the spring force of spring 214, which allows water to flow through check valve 212. In a backflow situation, water enters check valve 212 from the right in FIG. 8. In this situation, the bias of spring 214 pushes piston 213 against piston seat 215, preventing water from flowing through check valve 212. In some aspects, backflow preventer 210 may be configured to withstand a desired backflow pressure. This means that backflow preventer 210 will successfully block a backflow up to a certain pressure. For example, backflow preventer 210 may be configured to function with backflow pressures as high as 200 PSI.

Also shown in FIG. 7 is a pressure reduction valve 220. Pressure reduction valve 220 functions to regulate the incoming water pressure down to a desirable pressure for operation in beverage dispenser 1. For example, pressure reduction valve 220 may be configured to regulate pressure to approximately 55 PSI, plus or minus 10%. In an aspect, pressure reduction valve 220 has a valve 222 that is biased closed by a spring 224. The spring force of spring 224 is calibrated such that valve 222 only allows water to flow up to the desired pressure (e.g., 55 PSI). In some aspects, the spring force of spring 224 can be adjusted by, for example, a threaded element that the spring rests on that can adjust the length of spring 224 (and, thus, the spring force).

Also shown in FIGS. 5-7 is a water hammer section 300. Water hammer section 300 is inserted between and fluidly connects backflow preventer 210 and pressure reduction valve 220, and is formed as a cylindrical passage with a water hammer outlet 302 branching off from the passage approximately midway between backflow preventer 210 and pressure reduction valve 220. Water hammer section 300 (and water hammer outlet 302) are configured to address potential water hammer issues by allowing for various elements to be attached to connector 200 (via water hammer outlet 302), such as additional plumbing connections, a water hammer preventer, or other elements.

In addition to the aspect of connector 200 discussed above, two further aspects are available. In a second aspect, connector 200 does not include pressure reduction valve 220. The space formerly occupied by pressure reduction valve 220 is left open in housing 202 and second end housing 206. This aspect of connector 200 is suitable for use in situations where fluctuations in water pressure are unlikely. Removing pressure reduction valve 220 from connector 200 reduces manufacturing cost and complexity while retaining the necessary backflow prevention functionality. Removing pressure reduction valve 220 can also increase flow rate through connector 200.

Figure 9:
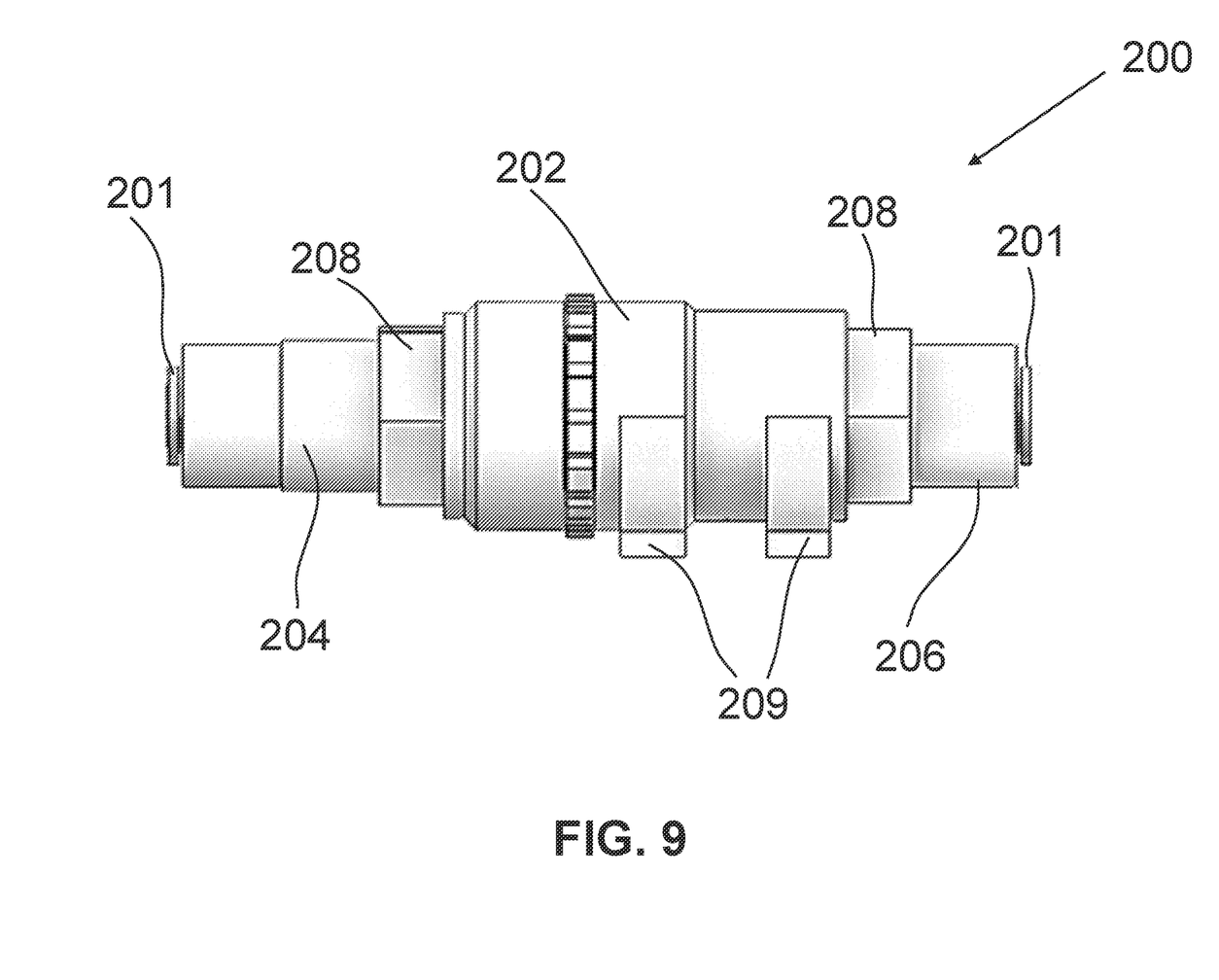
FIG. 9 is a side view of a beverage dispenser connector according to an aspect.

An additional aspect of connector 200 shown in FIG. 9 does not include water hammer section 300. In this aspect, pressure reduction valve 220 and backflow preventer 210 are located adjacent to each other. This mean that connector 200 can be made shorter with respect to the axial direction of housing 202.

Elements of connector 200 can be constructed from any suitable material. For example, cylindrical housing 202, first end housing 204, and second end housing 206 may be constructed from metal or plastic materials. Internal elements such as check valve 212 or pressure regulator valve 220 can also be constructed from metal or plastic materials.

A method of connecting aspects of connector 200 discussed above begins with fluidly connecting connector 200 to an external water supply and to beverage dispenser 1 via fluid connections 201. This can be done by using suitable plumbing connections (e.g., push quick-connects or threaded elements). Next, connector 200 is physical secured to beverage dispenser 1 using mounts 209 and suitable fasteners.

It is to be appreciated that the Detailed Description section, and not the Summary and Abstract sections, is intended to be used to interpret the claims. The Summary and Abstract sections may set forth one or more but not all exemplary aspects of the present invention(s) as contemplated by the inventors, and thus, are not intended to limit the present invention(s) and the appended claims in any way.

The foregoing description of the specific aspects will so fully reveal the general nature of the invention(s) that others can, by applying knowledge within the skill of the art, readily modify or adapt for various applications such specific aspects, without undue experimentation, and without departing from the general concept of the present invention (s). Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary aspects, but should be defined only in accordance with the following claims and their equivalents.

What is claimed is:

1. A water supply connector for a beverage dispenser, comprising:
    a cylindrical housing;
    a first end housing disposed at a first end of the cylindrical housing;
    a second end housing disposed at a second end of the cylindrical housing;
    first and second fluid connections configured to fluidly connect an interior of the cylindrical housing with external plumbing, the first fluid connection disposed at a distal end of the first end housing and the second fluid connection disposed at a distal end of the second end housing;
    a backflow preventer comprising a check valve disposed in the cylindrical housing, the backflow preventer configured to only permit water flow from the first end housing to the second end housing; and
    a pressure regulator valve disposed in the cylindrical housing, the pressure regulator valve configured to reduce a pressure of water passing through the connector to a desired pressure.

2. The water supply connector of claim 1, further comprising a strainer disposed in the first end housing upstream of the check valve, the strainer configured to remove contaminants from the water flow.

3. The water supply connector of claim 1, further comprising first and second nuts, each of which is disposed over one of the first and second end housings, respectively, and is engaged with threads disposed on the cylindrical housing to secure the first and second end housings to the cylindrical housing,
    wherein the first end housing and the second end housing are separable from the cylindrical housing by removing the first and second nuts, respectively.

4. The water supply connector of claim 1, further comprising a mount connected to the cylindrical housing, the mount configured to receive a fastener for fastening the water supply connector to a support surface.

5. The water supply connector of claim 4, wherein a total height of the water supply connector measured from a bottom of the mount to a top of the connector is less than 50 millimeters.

6. A water supply connector for a beverage dispenser, comprising:
    a cylindrical housing;
    a first end housing disposed at a first end of the cylindrical housing;
    a second end housing disposed at a second end of the cylindrical housing;
    first and second nuts, each of which is disposed over one of the first and second end housings, respectively, and is engaged with threads disposed on the cylindrical housing to secure the first and second end housings to the cylindrical housing, wherein the first end housing and the second end housing are separable from the cylindrical housing by removing the first and second nuts, respectively;
    first and second fluid connections configured to fluidly connect an interior of the cylindrical housing with external plumbing, the first fluid connection disposed at a distal end of the first end housing and the second fluid connection disposed at a distal end of the second end housing;
    a backflow preventer comprising a check valve disposed in the first end housing and the cylindrical housing, the backflow preventer configured to only permit water flow from the first end housing to the second end housing; and
    a pressure regulator valve disposed in the cylindrical housing and the second end housing, the pressure regulator valve configured to regulate a pressure of water exiting the connector to a desired pressure.

7. The water supply connector of claim 6, further comprising a strainer disposed in the first end housing upstream of the check valve, the strainer configured to remove contaminants from the water flow.

8. The water supply connector of claim 6, further comprising a mount connected to the cylindrical housing, the mount configured to receive a fastener for fastening the water supply connector to a support surface.

9. The water supply connector of claim 8, wherein a total height of the water supply connector measured from a bottom of the mount to a top of the connector is less than 50 millimeters.

10. A beverage dispenser, comprising:
    a housing;
    a nozzle disposed on a portion of the housing, the nozzle configured to dispense a beverage;
    a water supply connector for connecting a water supply to the beverage dispenser, the water supply connector comprising:
        a cylindrical housing;
        a first end housing disposed at a first end of the cylindrical housing;
        a second end housing disposed at a second end of the cylindrical housing;
        first and second fluid connections configured to fluidly connect an interior of the cylindrical housing with external plumbing, the first fluid connection disposed at a distal end of the first end housing and the second fluid connection disposed at a distal end of the second end housing;
        a mount connected to the cylindrical housing, the mount formed as a protrusion extending from the cylindrical housing, the protrusion configured to receive a fastener, wherein the mount is configured to secure the water supply connector to a surface;
        a backflow preventer comprising a check valve disposed in the cylindrical housing, the backflow preventer configured to only permit water flow from the first end housing to the second end housing;
        a pressure regulator valve disposed in the cylindrical housing, the pressure regulator valve configured to reduce a pressure of water passing through the connector to a desired pressure.

11. The beverage dispenser of claim 10, wherein the water supply connector further comprises:
    a strainer disposed in the first end housing upstream of the check valve, the strainer configured to remove contaminants from the water flow.

12. The beverage dispenser of claim 10, wherein the water supply connector further comprises:
    first and second nuts, each of which is disposed over one of the first and second end housings, respectively, and is engaged with threads disposed on the cylindrical housing to secure the first and second end housings to the cylindrical housing, wherein the first end housing and the second end housing are separable from the cylindrical housing by removing the first and second nuts, respectively.

13. The beverage dispenser of claim 10, wherein a total height of the water supply connector measured from a bottom of the mount to a top of the connector is less than 50 millimeters.

\* \* \* \* \*